US008306910B2

(12) United States Patent
Wilkes

(10) Patent No.: US 8,306,910 B2
(45) Date of Patent: Nov. 6, 2012

(54) SYSTEMS AND METHODS FOR ELECTRONICALLY CIRCULATING A CURRENCY

(75) Inventor: Bradley Wilkes, Alpine, UT (US)

(73) Assignee: Capital Will LLC, Alpine, UT (US)

( * ) Notice: Subject to any disclaimer, the term of this patent is extended or adjusted under 35 U.S.C. 154(b) by 606 days.

(21) Appl. No.: 12/472,249

(22) Filed: May 26, 2009

(65) Prior Publication Data

US 2010/0306087 A1 Dec. 2, 2010

(51) Int. Cl.
 G06Q 40/00 (2012.01)
 G07B 17/00 (2006.01)
 G07F 19/00 (2006.01)
(52) U.S. Cl. .................. 705/39; 705/30; 705/37; 705/44
(58) Field of Classification Search .................... 705/30, 705/35, 39, 37, 44
 See application file for complete search history.

(56) References Cited

U.S. PATENT DOCUMENTS

| 5,768,385 | A | * | 6/1998 | Simon | 705/69 |
| 5,832,089 | A | * | 11/1998 | Kravitz et al. | 705/69 |
| 5,937,394 | A | * | 8/1999 | Wong et al. | 705/26.1 |
| 5,983,207 | A | * | 11/1999 | Turk et al. | 705/39 |
| 6,122,625 | A | | 9/2000 | Rosen | |
| 6,205,437 | B1 | | 3/2001 | Gifford | |
| 6,678,401 | B2 | * | 1/2004 | Jones et al. | 382/135 |
| 7,206,763 | B2 | * | 4/2007 | Turk | 705/39 |
| 7,269,256 | B2 | | 9/2007 | Rosen | |
| 7,590,602 | B1 | | 9/2009 | Luzzatto | |
| 7,814,009 | B1 | * | 10/2010 | Frenkel | 705/39 |

| 2002/0013767 | A1 | * | 1/2002 | Katz | 705/39 |
| 2002/0022966 | A1 | | 2/2002 | Horgan | |
| 2003/0059098 | A1 | * | 3/2003 | Jones et al. | 382/135 |
| 2003/0132281 | A1 | * | 7/2003 | Jones et al. | 235/379 |
| 2003/0149662 | A1 | | 8/2003 | Shore | |
| 2006/0116960 | A1 | | 6/2006 | Gillin et al. | |

(Continued)

FOREIGN PATENT DOCUMENTS

JP 2003-076851 A 3/2003

OTHER PUBLICATIONS

NCR Corporation; NCR Lauded by Federal Credit Union Association Services Corp. for Innovative Cash Recycling Technology. (Jul. 2008). Business & Finance Week,163. Retrieved Jul. 2, 2012, from ABI/INFORM Global.*

(Continued)

Primary Examiner — Scott Zare
(74) Attorney, Agent, or Firm — Stoel Rives LLP

(57) ABSTRACT

One or more currency notes deposited at a currency reserve may be electronically circulated by a transaction provider. The transaction provider may maintain a record of the ownership status of the one or more currency notes in a computer-readable storage medium. The transaction provider may provide for an entity to obtain ownership of a currency notes. The entity may submit a request to the transaction provider to transfer a currency note to another entity. The transaction provider may authorize the request, and may perform the transfer if the request is authorized. The transfer of ownership may take place while maintaining the physical currency note in the currency reserve. A record of the transaction may be stored by the transaction provider and/or transmitted to the parties to the transfer. The transaction provider may allow for the exchange or currency notes into other denomination and/or currency types.

21 Claims, 5 Drawing Sheets

U.S. PATENT DOCUMENTS

| | | | |
|---|---|---|---|
| 2007/0150413 | A1 | 6/2007 | Morgenstern |
| 2007/0179883 | A1 | 8/2007 | Questembert |
| 2007/0244812 | A1 | 10/2007 | Turk et al. |
| 2007/0255653 | A1 | 11/2007 | Tumminaro et al. |
| 2008/0040274 | A1 | 2/2008 | Uzo |
| 2008/0195499 | A1 | 8/2008 | Meredith et al. |
| 2008/0262969 | A1 | 10/2008 | Samid |
| 2009/0094134 | A1 | 4/2009 | Toomer et al. |
| 2009/0119190 | A1 | 5/2009 | Realini |
| 2009/0119209 | A1 | 5/2009 | Sorensen et al. |
| 2009/0319433 | A1* | 12/2009 | Luzzatto ............... 705/75 |
| 2010/0088231 | A1 | 4/2010 | Eugenio |

OTHER PUBLICATIONS

Jung, Wook et al., "A Comparison of Electronic Cash Schemes and Their Implementations," ECE 646 AS-3 Group Project, George Mason University, 50 pgs.

"CashEdge Unveils a P2P Service to be Controlled by Banks," http://www.javelinstrategy.com/2009/06/24/cashedge-unveils-a-p2p-serv..., Jun. 24, 2009, printed Jul. 15, 2009, 1 pg.

"Anti-anti money laundering," http://digitaldebateblogs.typepad.com/digital_money/2009/06/anti-anti-m..., Jun. 7, 2009, printed Jul. 15, 2009, 3 pgs.

"Pay With Facebook? No Thanks!" http://worldboxx.com/pay-with-facebook-no-thanks/, printed Jul. 15, 2009, 2 pgs.

Kincaid, Jason, "Facebook Revs Up for Payment Platform with Updated Terms," http://www.techcrunch.com/2009/05/29/facebook-revs-up-for-payment-pl..., May 29, 2009, printed Jul. 15, 2009, 3 pgs.

"Should the Fed be the $14^{th}$ Payment Network, and How Would That Solve the Problems?" http://thebankwatch.com/2009/05/26/should-the-fed-be-the-14th-payment..., printed Jul. 15, 2009, 2 pgs.

"New to Virtual Currency? Where to begin (Part 2)," http://blog.twofish.com/2009/04/new-to-virtual-currency-where-to-begin-, printed Jul. 15, 2009, 2 pgs.

Rutherford, Lisa, "The Universal Currency Wars Are Coming," http://venturebeat.com/2009/05/29/the-universal-currency-wars-are-coming/, May 29, 2009, printed Jul. 15, 2009, 3 pgs.

Cardinale, Matthew, "Local Currencies Really Can Buy Happiness," May 30, Atlanta, Georgia, http://ipsnorthamerica.net/print.php?idnews=2280, printed Jul. 15, 2009, 2 pgs.

Wolfers, Justin, "Forecast: There Will Be No More Cash in 2012," http://freakonomics.blogs.nytimes.com/2009/05/19/forecast-there-will-be..., May 19, 2009, printed Jul. 15, 2009, 1 pg.

Van Dyke, James, "American President Says, 'Tear Down That Wall!' (wait, it's Obama instead of Reagan, and he's using money transfers!)," htp://www.javelinstrategy.com/2009/04/13/american-president-says-tear..., Apr. 13, 2009, printed Jul. 15, 2009, 1 pg.

International Search Report with Written Opinion for PCT/US2010/036252 filed May 26, 2010, and mailed Jan. 3, 2011, 9 pgs.

International Preliminary Report on Patentability for PCT/US2010/036252 filed May 26, 2010, and mailed Dec. 8, 2011, 6 pgs.

Office Action for U.S. Appl. No. 12/645,079, filed Dec. 22, 2009, mailed Oct. 26, 2011, 17 pgs.

* cited by examiner

SYSTEMS AND METHODS FOR ELECTRONICALLY CIRCULATING A CURRENCY

TECHNICAL FIELD

This disclosure relates to payment transaction systems and, in particular, to systems and methods for electronically circulating a currency.

BRIEF DESCRIPTION OF THE DRAWINGS

Additional aspects and advantages will be apparent from the following detailed description of preferred embodiments, which proceeds with reference to the accompanying drawings, in which.

DETAILED DESCRIPTION

Various payment systems are available through which a payee may accept payment from a payer. Many of these payment systems impose transaction costs. For example, a credit card transaction may include fixed and percentage-based transaction costs payable to the credit card issuer and/or a credit card authorization service.

In addition, many conventional payment systems require that the payer and/or payee be registered with a payment service (transaction provider). For example, in order to pay via credit card, the payee must apply, and be approved for, a credit account with a credit card issuer. Similarly, the payee may be required to have a merchant account with the card issuer (or have some other arrangement for accepting credit card payments). Some potential payees may not wish to register with a credit card issuer and/or may not qualify for a credit line with the card issuer.

Furthermore, the transaction may require that the payer and payee provide personal information to the transaction provider. For example, the payer may be required to provide personal information in order to apply for an account with a transaction provider (e.g., credit card issuer), and the payee may be required to register a merchant account to receive payments through the transaction provider. Other transaction systems (e.g., bank transfers, many on-line transaction systems, and the like) may require that personal information be disclosed.

This private, personally-identifying information may be maintained in confidence by the transaction provider (e.g., credit card issuer). However, information leakage may occur. For example, merchants and transaction providers have experienced data breaches wherein customers' personal information has been exposed.

Moreover, the transaction between the payer and payee may require the payer to expose personal information. For example, in a credit card transaction, the payer may be required to provide a credit card number, verification number, and/or a signature. This information could be used at a later time to make fraudulent transactions using the payer's card.

The systems and methods disclosed herein may provide for electronically circulating a currency to thereby provide low cost transactions, which may minimize the need for personal information to be exchanged between transacting entities. In addition, the transactions disclosed herein may be performed using little or no personally identifying information.

Figure 1:
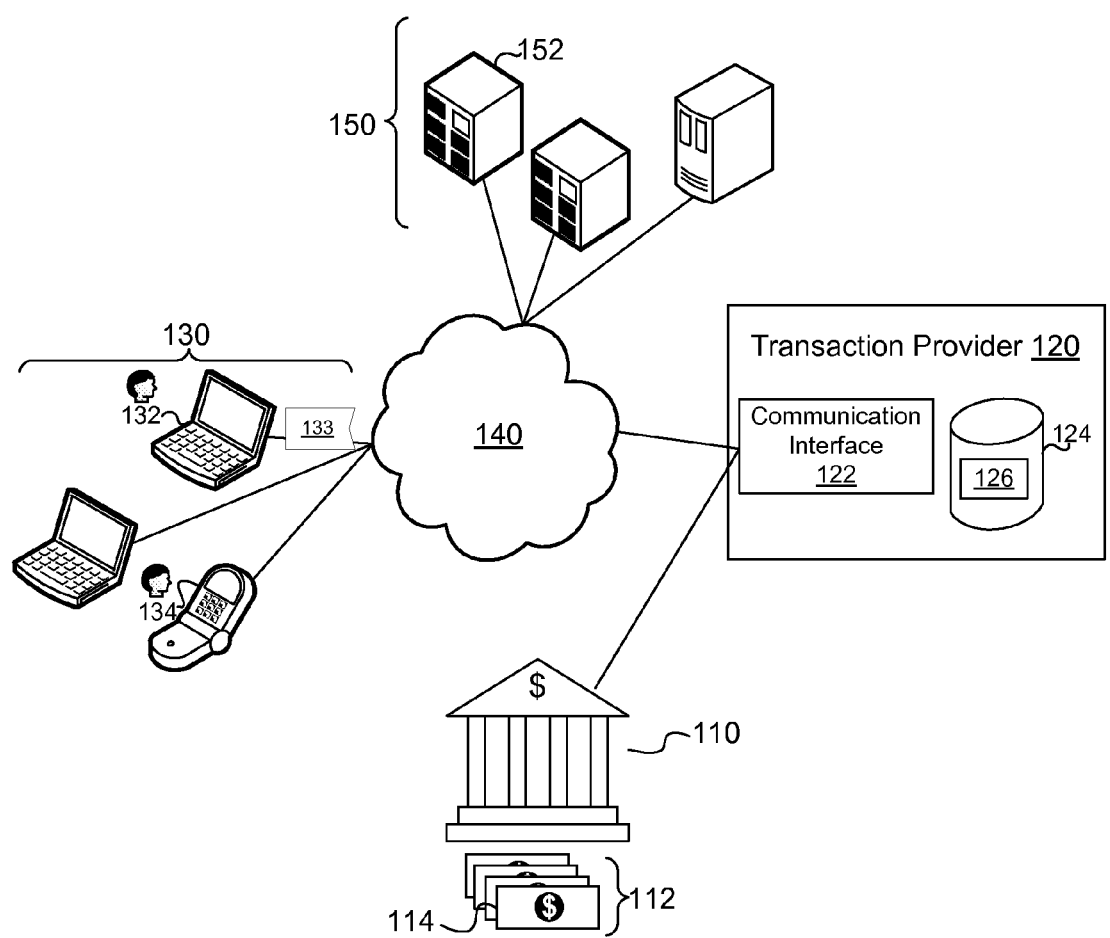
FIG. 1 is a block diagram of a system for electronically circulating a currency.

FIG. 1 is a block diagram of one embodiment of a system for electronically circulating a currency. The system 100 includes a currency reserve 110, which may be a depository institution, such as a bank, a savings bank, a credit union, a financial institution, or any other entity capable of holding currency.

The currency reserve 110 may comprise a set of currency notes 112 that are dedicated for use by the currency circulation system 100. The currency notes 112 may include any currency type in any denomination. For example, the currency notes 112 may include a plurality of United States dollars in one (1) dollar denominations, five (5) dollar denominations, ten (10) dollar denominations, and so on.

Each of the currency notes 112 may have certain attributes from which a unique identifier of the currency note may be derived (a unique currency note identifier or "UCNID"). For example, United States dollar currency notes may include a serial number, a series date, and other attributes. These attributes may be used to generate a UCNID for the note, which may uniquely identify the currency note.

The system 100 includes a transaction provider 120. The transaction provider 120 may comprise one or more computing devices (e.g., server computers), each of which may comprise one or more processors (not shown), memory units (not shown), a computer-readable storage medium 122, human-machine interface (HMI) components (e.g., input/output devices, displays, etc., (not shown)), communication interfaces 124, and the like.

The transaction provider 120 may be implemented using one or more computer-readable instructions stored on a computer-readable storage medium (e.g., the computer-readable storage medium 122). Therefore, portions of the transaction provider 120 may be embodied as discrete software modules on the computer-readable storage medium 122. Other portions and/or components of the transaction provider 120 may be implemented using one or more hardware components and/or may be tied to particular hardware components. For example, the data structure 126 (discussed below) may be tied to the computer-readable storage medium, and/or the communication interface 124 may be tied to particular communications devices (e.g., network interface cards, wireless transmitters, etc.). Therefore, portions of the transaction provider 120 may be tied to a particular machine.

The transaction provider 120 may be communicatively coupled to the currency reserve 110. The communication therebetween may be continuous and/or periodic. The transaction provider 120 may receive from the currency reserve a listing of currency notes 112 in the currency reserve. The listing may include attributes of the currency notes 112, such as the denomination, serial number, and the like. The transaction provider 120 may be configured to derive respective UCNID for the currency notes 112 using this information. The transaction provider 120 may store a representation of each currency note 112 in a data structure 126 stored on the computer-readable storage medium 122. As will be described below, the transaction provider 120 may use the data structure 126 to maintain a record of the currency notes 112 and/or to manage ownership of the currency notes 112 by one or more entities 130. The transaction provider 120 may be in communication with the currency reserve 110 to periodically audit the currency notes 112. An audit of the currency notes 112 may comprise verifying that the currency notes 112 represented in the data structure 126 are physically present at the currency reserve 110. In addition, the transaction provider 120 may be coupled to the currency reserve 110 to manage transfer of currency into and/or out of the set of currency notes 112 dedicated to the electronic currency circulation system 100.

The data structure 126 may include a representation of the currency notes 112 in the currency reserve 110. The currency notes 112 may be represented using respective UCNIDs associated with each currency note 112. As discussed above, the UCNID of currency note may be derived from one or more attributes of the currency notes 112 (e.g., the issuer of the currency note, a serial number of the currency note, issue date of the currency note, or the like). In some embodiments, the UCNID of a currency note 112 may be embodied as a uniform resource identifier (URI), a uniform resource locator (URL), a distinguished name (DN), a hash value, or the like. Use of a URI or URL may allow the currency note representations to be referenced on the communication network 140 (e.g., may allow one or more entities 130 to access ownership (and other) information about a currency note circulated by the transaction provider 120 using the URI/URL assigned to the currency note).

The transaction provider 120 may be communicatively coupled to one or more entities 130 via the communication network 140, which may comprise any communication network and/or infrastructure known in the art (e.g., a TCP/IP network, the Internet, a virtual private network (VPN), a wide area network (WAN), a public switched telephone network (PSTN), a combination of networks, or the like).

As shown in FIG. 1, the entities 130 may be communicatively coupled to the transaction provider 120 by the communication network 140 through respective computing devices. As used herein, an entity may refer to an individual person, an organization, a business organization (e.g., a limited liability company (LLC), a partnership, or any other business organization), a storefront, a group, a non-profit organization, or any other entity capable of entering into monetary transactions with other entities.

Each entity 130 may be identified using a respective identifier. The identifier for a particular entity 130 may be referred to as a unique entity identifier or "UEID." A UEID may include, but is not limited to: an email address, a DN, a URI, a uniform name identifier (URN), an OpenID® identifier (registered trademark of the OpenID Foundation Corp., Portland, Oreg.), or any other identifier capable of uniquely identifying an entity (e.g., a legal name, a corporate name, a doing business as (DBA) name, or the like).

In some embodiments, one or more of the entities 130 may be associated with a third-party service 150, which may be configured to authenticate the entities 130 and/or authenticate messages transmitted by the entities 130. The third-party service 150 may include, but is not limited to: a certificate authority (e.g., an X.509 certificate authority), an authentication authority and/or identity provider (e.g., a Security Assertion Markup Language (SAML) authentication authority, a Liberty Alliance Authenticating Authority, an OpenID® provider, etc.), or any other service capable of authenticating the identity of an entity 130 and/or validating the authenticity of data transmitted thereby. In some embodiments, the transaction provider 120 may be configured to provide authentication and/or authorization services (e.g., may act as an authentication/authorization authority).

The transaction provider 120 may be configured to assign ownership of the currency notes 112 to one or more of the entities 130. In some embodiments, assigning ownership may comprise associating a UCNID of a currency note with a unique identifier of the current owner of the currency note in the data structure 126, while maintaining the currency notes 112 in the currency reserve 110. The transaction provider 120 may use the data structure 126 to maintain the ownership associations. As will be discussed below, the entities 130 may enter into currency circulation transactions (e.g., transaction to transfer ownership of the currency notes (e.g., make payments, etc.)) using the transaction provider 120. The transactions disclosed herein may take place without requiring the physical transfer of the currency notes 112 into and/or out of the currency reserve 110, which may minimize transaction costs. Moreover, the transfers disclosed herein may take place using a third-party service 150 and, as such, minimal personally-identifying information about the entities 130 need be exposed to the transaction provider 120.

The data structure 126 may be implemented using any data storage technique known in the art including, but not limited to: a file system, structured data (e.g., XML, as delimiter-separated values, etc.), a relational data store (e.g., a database), a directory (e.g., a Lightweight Directory Access Protocol (LDAP) directory, an X.509 directory, or the like), or the like. In the FIG. 1 example, the data structure 126 may be implemented using a Structured Query Language (SQL) database.

Figure 2:
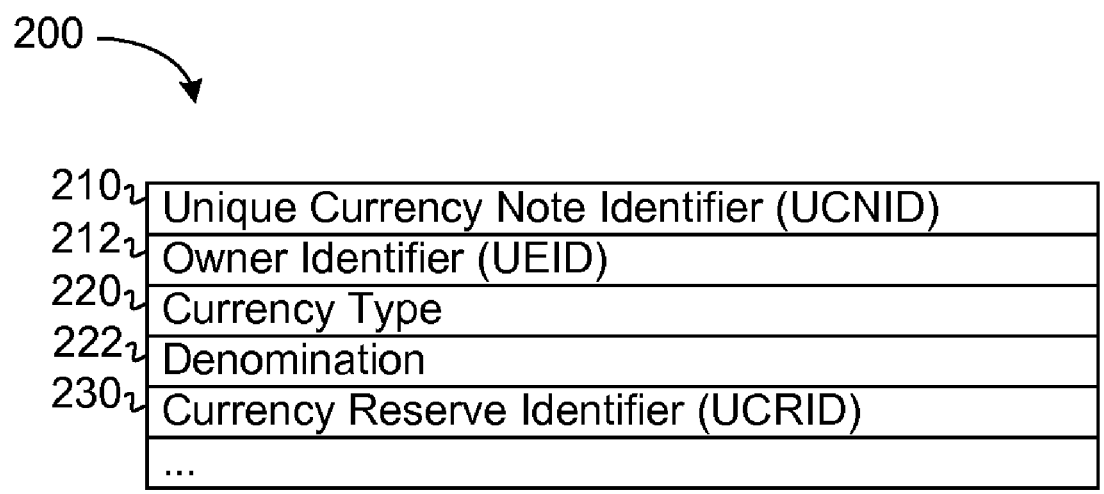
FIG. 2 depicts one embodiment of a data structure to maintain ownership information of an electronically circulated currency note maintained in a currency reserve.

FIG. 2 shows one example of a data structure (e.g., a database table) 200, which may be used by a transaction provider (e.g., transaction provider 120) to electronically circulate a currency note maintained in a currency reserve.

The table 200 includes a currency note identifier field 210, which may be used to store the UCNID of a particular currency note (e.g., one of the currency notes 112 deposed in a currency repository 110). The UCNID 210 may be used as a "primary key" of the table 200 and, as such, may be used to identify and/or reference a specific instance of the table 200.

The table 200 may further include an owner field 212. The owner field 212 may be used to store an identifier of the owner of the currency note (e.g., the UEID of the owner). The owner field 212 may be used as a "primary key" to index the table 200 (e.g., as a primary key, a foreign key, or other indexing data). This may allow for quick identification of the currency notes owned by a particular entity.

In other embodiments, the ownership field 212 may comprise a list of partial owners of the currency note. In this case, multiple owners may each own a portion (e.g., a percentage) of a currency note (e.g., two (2) owners may each own fifty (50) percent of a currency note). Each owner may be allowed to transfer his/her ownership interest in the currency note.

In some embodiments, the owner field 212 may comprise a list that may include the current owner of the currency note as well as any previous owners. For example, the current owner of the currency note may be placed at the head of the field 212, with the following UEIDs being the previous owners of the currency note. Alternatively, or in addition, information regarding the ownership history of the currency note may be maintained in a separate field (not shown) of the table 200. Other embodiments may selectively omit the ownership history of the currency note.

In addition, although not shown in FIG. 2, the data structure 200 may include references (e.g., identifiers, foreign keys, etc.) to records of transaction in which the currency note was transferred between entities. As will be discussed below, a transaction provider may provide for transferring ownership of one or more currency notes from a first entity to a second entity. As transfers take place, the transaction provider may produce an electronic and/or tangible record of the transfer, which may identify the parties to the transaction, the currency notes transferred, the date of the transfer, and the like. The data structure 200 may include a field (not shown) referencing the transactions in which the currency note was transferred. This may allow for auditing and/or validation of particular transfers and/or for the transaction history of a particular set of currency notes to be traced.

The table 200 may include information describing the currency note. A field 220 may identify the currency note type and/or currency note issuer (e.g., identify the currency note as a United States dollar, a Euro, or the like). A field 222 may identify the denomination of the currency note (e.g., whether the note is a one (1) dollar bill, a five (5) dollar bill, and so on). Alternatively, or in addition, the UCNID of the currency note (stored in field 210) may include the denomination information and/or may be used to validate the denomination information in the field 222. In this way, the currency note denomination may be tied to the UCNID to thereby prevent the denomination field 222 from being tampered with and/or modified. Although not depicted in FIG. 2, additional fields related to the currency note could be included, such as the date the currency note was deposited in the currency reserve (not shown), and the like.

In some embodiments, the table 200 may include information regarding the currency repository that holds the physical currency note. For example, a field 230 may provide a unique identifier of the currency repository (a unique currency repository identifier of "UCRID"). The UCRID may be a "foreign key" that identifies a table comprising information about the currency repository (not shown). A currency repository data structure (e.g., database table) could include an address of the currency repository, contact information for the currency repository, the date the currency note was verified to exist at the currency repository, auditing information (e.g., instructions for performing an audit of the currency repository to ensure that the physical currency note is present at the currency repository), and the like. Alternatively, the table 200 may include information regarding the currency repository directly in one of more fields (not shown).

Referring back to FIG. 1, the transaction provider 120 may be configured to maintain a record of the ownership of one or more the currency notes 112 using inter alia the data structure 126. An entity 130 may become the owner of a currency note in various ways, including, but not limited to: purchasing one or more currency notes 112 from a currency repository 110 and/or the transaction provider 120, transferring one or more currency notes 112 into a currency repository 110, receiving ownership of one or more currency notes 112 from another entity 130 (e.g., via a transfer), or the like.

For example, a particular entity 132 may purchase one or more currency notes 112 from a currency repository 110. The purchase may be performed directly with the currency repository 110 (e.g., by exchanging currency, issuing a check, performing a wire transfer, a credit card transaction, or the like). Alternatively, the currency may be purchased through the transaction provider 120. For example, the entity 132 may issue a request to the transaction provider 120 to purchase one or more currency notes 112 in a currency repository 110. The transaction provider 120 may arrange a transfer of funds between the entity 132 and the currency repository 110 (e.g., via a currency exchange, check, wire transfer, credit card transaction, or the like). Purchasing a currency note by the entity 132 may not require that the currency notes 112 be relocated from the currency repository 110. For example, a number of currency notes 112 may be owned by the currency repository 110 and/or the transaction provider 120. Therefore, as the currency notes are purchased by the entity 132, the ownership of the currency notes 11 may be updated, but no deposit or other physical handing of the notes 112 may be required. Alternatively, or in addition, the entity 132 may directly deposit one or more currency notes in the currency reserve 110 for inclusion in the currency notes 112.

The currency notes deposited by the entity 132 may be registered with the transaction provider 120. As described above, registration of a currency note may comprise the transaction provider 120 assigning respective UCNIDs to the currency notes and/or assigning ownership of the currency notes (e.g., to the depositor/purchaser of the currency notes, such as the entity 132, the transaction provider 120, and/or the currency reserve 110 itself). As discussed above, assigning ownership to a currency note 112 may comprise associating the UCNID of the current note with a unique identifier of the owner (e.g., a unique identifier of an entity 130 (the UEID of the entity 130), an identifier of the currency reserve 110, an identifier of the transaction provider 120, or the like).

The transaction provider 120 may provide a mechanism whereby ownership of currency notes 112 may be transferred between the entities 130. The transfer of ownership may be performed while maintaining the currency notes 112 in the currency reserve 110.

The transaction provider 120 may be configured to receive a transfer request from an entity 130, the request specifying one or more currency notes 112 to transfer to another entity 130. The transaction provider 120 may authorize the request and, if the request is authorized, may transfer ownership of the one or more currency notes 112. Transferring ownership may comprise the transaction provider 120 setting another entity 130 as the owner of the one or more currency notes in the data structure 126.

As an illustrative example, the transaction provider 120 may receive a transfer request 133 from the first entity 132 to transfer a particular currency note 114 to a second entity 134 (e.g., make a payment to the second entity 134) over the network 140. The transfer request 133 may include an identifier of a currency note 114 to transfer (e.g., include the UCNID of the currency note 114), the UEID of the first entity 132 and an identifier of the second entity 134.

The transaction provider 120 may authorize the transfer request 133 and, if the transfer request 133 is authorized, may transfer ownership of the currency note 114 to the second entity 134. Authorizing the request may comprise verifying that the first entity 132 is the current owner of the currency note 114. The transaction provider 120 may query the data structure 126 to determine ownership of the currency note 114. The query may comprise accessing a data entry associated with the currency note 114 (e.g., the UCNID of the currency note 114) in the data structure 126 (e.g., database table, such as table 200 of FIG. 2). Ownership may be determined by comparing the owner field of the data entry associated with the currency note (e.g., the value of the owner field 212 of FIG. 2) to the UEID of the first entity 132. If the identifiers match, the transaction provider 120 may verify that the first entity 132 is the owner of the currency note 114 and the requested transfer may proceed; otherwise, the transaction provider 120 may determine that the first entity 132 is not the owner, and the request may be rejected.

After authorizing the request, the transaction provider 120 may transfer the currency note 114 from the first entity 132 to the second entity 134. As discussed above, transferring ownership may comprise associating the currency note 114 with the second entity 134 in the data structure 126. In the FIG. 2 example, transferring may comprise setting the current owner field 222 to an identifier (e.g., a UEID) of the second entity 134 (as provided in the transfer request 133).

In some embodiments, the transfer request 133 may not specify a particular currency note 114, but instead, may request that ownership of a particular amount of currency (e.g., six (6) dollars) be transferred to the second entity 134. In this case, the transaction provider 120 may be configured to identify currency notes 112 owned by the first entity 132 in the data structure 126 that amount to the requested transfer amount. If the currency notes can be identified (e.g., if the first entity 132 owns enough currency to fulfill the transfer request 133), the transfer may proceed as described above (e.g., ownership in the identified currency notes may be transferred to the second entity 134). Alternatively, or in addition, the transaction provider 120 may be configured to automatically exchange one or more currency notes owned by the first entity 132 for currency notes of the requested type and/or amounting to the requested transfer amount. For example, the transaction provider 120 may exchange a twenty (20) dollar currency note owned by the first entity 132 for one (1) ten dollar currency note, a five (5) dollar currency note, and five (5) one (1) dollar currency notes, and to transfer to the second entity 134, the five (5) dollar currency note and one (1) one (1) dollar currency note. Other exchanges may be made. For instance, the transaction provider 120 may be configured to exchange United States currency for Canadian currency, to transfer partial ownership in one or more currency notes, and so on.

The transfer request 133 may comprise a unique identifier UEID of the transferee (e.g., the UEID of the second entity 134). The UEID of the second entity 134 may be an email address of the second entity 134, a DN of the second entity 134, or any other identifier of the second entity 134. Alternatively, or in addition, the second entity 134 may establish one or more aliases with the transaction provider 120. The aliases may provide for redirection of transfers to a particular unique identifier to another unique identifier. For instance, an alias may specify that transfers directed to "john.doe@yahoo.com" be redirected to "john.doe@openid.org." Therefore, a transfer request specifying a transfer to "john.doe@yahoo.com" may result in a transfer to "john.doe@openid.org." The first entity 132 may or may not be informed of the alias.

After processing the transfer request 133, the transaction provider 120 may be configured to transmit a record of the transaction to the first entity 132, the second entity 134, and/or the currency reserve 110. In addition, the transaction provider 120 may store a record of the transaction in the data structure 126 (e.g., in a table or other data structure adapted to store transaction records) and/or may generate a tangible record of the transaction (e.g., a paper receipt). The transaction request 133 may specify how the record of the transaction is to be processed (e.g., may specify confirmation email addresses, a physical address where a receipt may be mailed, and so on). The transaction provider 120 may be configured to provide recording of transaction requests that are fulfilled and/or of transaction requests that are not fulfilled (e.g., due to insufficient funds, non-ownership of currency, or the like).

In some embodiments, authorizing a transfer request may further comprise authenticating the transfer request and/or validating that the transfer request was authorized by the transferor. The transaction provider 120 may use one or more third-party authentication/authorization services 150 to authenticate the entities 130 and/or to verify communications received therefrom (e.g., verify transfer requests received from the entities 130). For instance, the first entity 132 may be associated with a particular third-party authentication/authorization service 152, such as an OpenID® provider. In this case, the transaction provider 120 may be configured to receive information authenticating the identity of the first entity 132 from the third-party service 152. For instance, the first entity 132 may provide an authentication credential to the service 152, which may authenticate the identity of the first entity 132 to the transaction provider 120 (e.g., via an application programming interface (API), such as the OpenID API, SAML API, Simple Object Access Protocol (SOAP), WS-Security API, or the like). In this way, the transaction provider 120 may authorize a transaction without receiving sensitive information from either entity 132 and/or 134.

Alternatively, or in addition to authenticating the identity of the entities 130, the transaction provider 120 may be configured to verify that communications transmitted to the provider 120 were made by and/or authorized by a particular entity 130 and/or verify the integrity of the communications. In some embodiments, the transaction provider 120 may be configured to communicate with the entities 130 over a secure connection, such as Secure Socket Layer (SSL) connection, or the like. The communications layer may provide verification of the integrity of messages transmitted thereon (e.g., verify that the request 133 was not tampered with and/or modified). In addition, the communications layer may provide authentication services (e.g., mutually authenticated SSL). The communications themselves (e.g., the transfer request 133) may include authentication/verification information, such as an HTTP AUTH header, a token, a digital signature, or the like. For example, the transfer request 133 may include a digital signature referencing a digital certificate issued to the first entity 132. The transaction provider 120 may access a third-party server 150 (e.g., certification authority) to verify the authenticity of the signature/certificate. This operation may validate the integrity of the message 133 and verify that the message was transmitted by and/or authorized by the first entity 132.

Alternatively, or in addition, the transaction provider 120 may be configured to authenticate one or more of the entities 130 directly. For example, the transaction provider 120 may provide for registration of one or more entities. Registration may comprise associating an identifier of the entity 130 (the UEID of the entity 130) with an authentication credential, such as a login name and/or password. An entity 130 may provide the credential to the transaction provider 120, which may use the credential to verify the identity of the entity 130.

Although particular authentication and/or message verification techniques are discussed herein, the transaction provider 130 could be configured to implement and/or leverage any authentication and/or verification technique available in the art. Therefore, this disclosure should not be read as limited in this regard.

The transaction provider 120 may provide for additional transaction types (e.g., may provide for other means for electronically circulating a currency). For instance, the transaction provider 120 may allow an entity 130 to exchange a first set of currency notes for a second set of currency notes. For example, the first entity 132 may be the owner of a currency note 114 for twenty (20) United States dollars. The first entity 132 may submit an exchange request to the transaction provider 120 to exchange the currency note 114 for a second set of currency notes (e.g., two (2) ten (10) United States dollar currency notes). The transaction provider 120 may authorize the exchange request (e.g., by verifying that the request was submitted and/or authorized by the first entity 132 and/or determining that the first entity 132 is the owner of the currency note 114). If the exchange request 133 is authorized, the transaction provider may transfer ownership of the currency note from the first entity 132 to another entity 130, to the currency reserve 110, and/or to the transaction provider 120, and may transfer ownership of the second set of currency notes (e.g., two (2) ten (10) dollar currency notes) to the first entity 132. The transaction provider 120 may provide for any type of currency exchange. For example, the first entity 132 may exchange United States currency for currency issued by another entity (e.g., Canadian currency, Euros, or the like). In this case, the currency reserve 110 may include currency notes 112 of many different types. Alternatively, or in addition, the transaction provider 120 may be communicatively coupled to additional currency reserves (not shown) in one or more foreign locales (e.g., in Canada, the European Union, and so on).

In addition, the transaction provider 120 may provide for adding currency notes to the currency reserve 110 (e.g., a deposit transaction), withdrawing currency notes and/or exchanging currency notes from a currency reserve 110, and so on. In some embodiments, the transaction provider 120 may provide for adding currency notes in a point-of-sale or kiosk device (not shown). Currency may be fed into the device by the entity (e.g., the first entity 132). Equivalent currency notes may be assigned to the first entity 132 responsive to the deposit. The first entity 132 may then use the currency notes in electronic currency circulation transactions using the transaction provider 120. Similarly, the first entity 132 may request disbursement of currency notes owned by the first entity (e.g., at a kiosk or other device). For example, the first entity 132 may transmit a request through the device for a particular note owned by the first entity 132 (e.g., currency note 114). Upon authorizing the request, the transaction provider 120 may transfer ownership of the currency note 114 to the currency repository 110 and/or to the transaction provider 120, and an equivalent currency note may be provided to the first entity 132 (e.g., dispensed from the device, provided as a redeemable receipt, or the like).

The transaction provider 120 may provide one or more user interface components to the entities 130. In some embodiments, the user interface components may be provided as web pages accessible using web browser software. Therefore, the transaction provider 120 may comprise and/or be communicatively coupled to one or more web server computers (not shown) each comprising respective processors, memories, computer-readable storage medium, and the like. The transaction provider 120 may be implemented in a clustered configuration (e.g., may comprise a plurality of computing devices in a single location and/or distributed geographically). Although web-based user interface components are described herein, the transaction provider could provide user interface components using any mechanism known in the art (e.g., a dedicated software application, a TELNET portal, or the like). Therefore, the teachings of this disclosure should not be read as limited in this regard.

The interface components provided by the transaction provider 120 may allow the entities 130 to view the currency notes 112 owned thereby, allow for the exchange of currency notes 112, transfer currency notes 112 to other entities 130, view the ownership status of various currency notes 112, view the ownership history of various currency notes 112, view a record of transactions performed by the transaction provider 120, and so on. Access to information regarding a particular entity 130 and/or to particular currency notes 112 may be restricted to particular entities 130. For example, only the first entity 132 and/or those entities authorized by the first entity 132 may be allowed to view the currency notes 112 owned by the first entity 132. Similarly, only the owner of a particular currency note 114 may be authorized to view the ownership status of the currency note 114, view the ownership history of the note, or the like. In other embodiments, access to ownership information may be provided to all interested entities. Access to records of transactions performed by the transaction provider 120 may be restricted to the one or more entities 130 that were parties in the transaction (e.g., access to a record of a transfer of the currency note 114 from the first entity 132 to the second entity 134 may be restricted to the first entity 132 and the second entity 134 and/or to those entities 130 authorized by the first and/or second entities 132 and/or 134). Alternatively, access may be open to all interested entities.

Figure 3A:
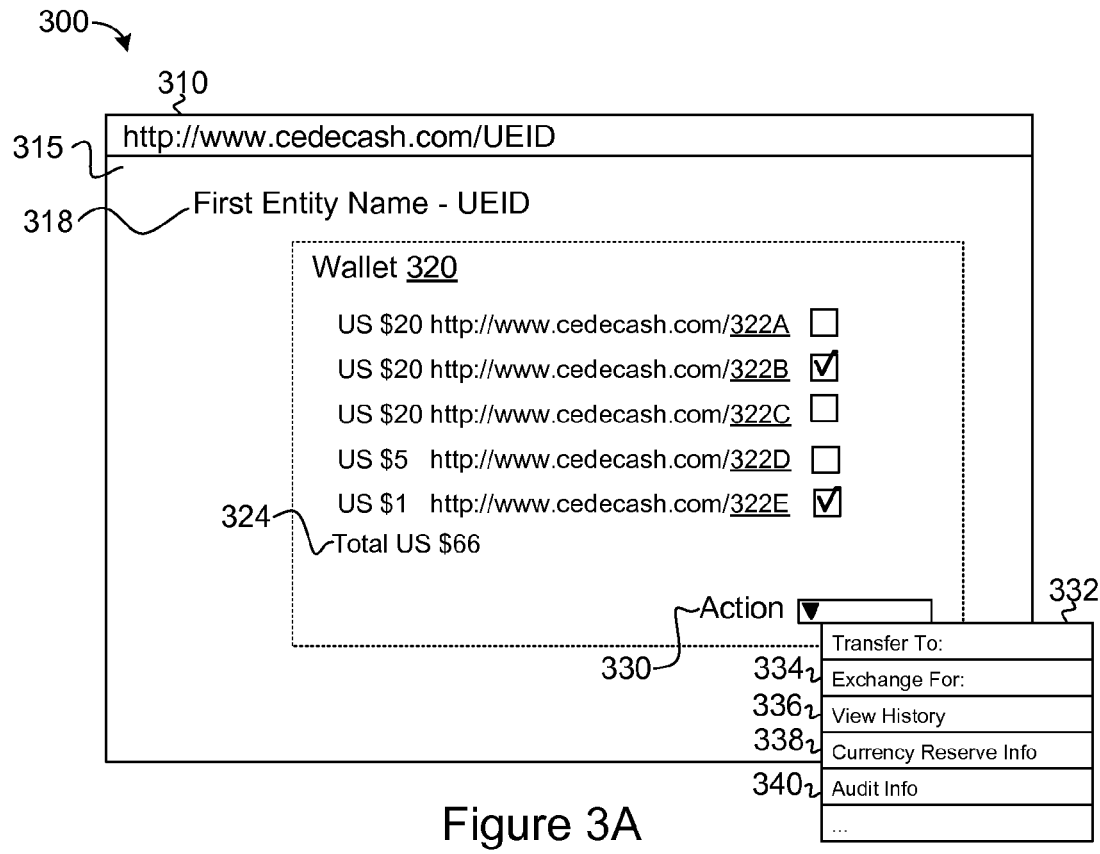
FIG. 3A depicts one embodiment of a transaction provider interface.

FIG. 3A shows one embodiment of an interface provided by the transaction provider 120. The interface 300 may comprise a web page 310 implemented using Hyper Text Markup Language (HTTP) adapted for display on a computing device (e.g., personal computer, cell phone, personal digital assistant (PDA), or the like) in a web browser application, such as Mozilla Firefox®, Microsoft Internet Explorer®, or the like. In some embodiments, access to the interface of a particular entity (e.g., the entity identified by the UEID 318) may be restricted to the entity and/or to those authorized by the entity. Access may be controlled via an authentication interface (not shown), whereby the entity may authenticate his/her identity directly to the transaction provider, such as the transaction provider 120 and/or to a third-party service 150 of FIG. 1 (e.g., the transaction provider may be configured to accept an authentication credential verifying the identity of the entity from one or more of the third-party services 150).

The interface 300 may be adapted to display information 315 regarding a particular entity 318. The interface may include a listing (e.g., wallet 320) of currency notes 322A-322E owned by the entity 318. The wallet 320 may display the total 324 value of the entity's currency notes 322A-322E. Accordingly, access to the interface 300 may be restricted to the particular entity and/or to those authorized to access the interface 300 by the particular entity (e.g., access to the interface 300 may be controlled by an authentication step, which, as discussed above, may be implemented by a third-party service).

An action interface 330 may allow the user to electronically circulate the currency notes 322A-322E, while maintaining the currency notes in respective currency reserve(s). The action interface may perform a selected action (e.g., action 332-340) on one or more selected currency notes 322A-322E. As shown in FIG. 3A, currency notes 322A-322E may be selected using an interface component (e.g., FIG. 3A shows a checkbox interface component in which currency notes 322B and 322E are selected). However, the interface 300 could include any interface component and/or selection mechanism known in the art.

The transfer action 332 may cause a transfer request to be transmitted to the transaction service. Selection of the transfer action 332 may allow the user of the interface 300 to provide an identifier of the entity to which the selected currency notes are to be transferred (e.g., an email address, distinguished name, alias, or the like). In some embodiments, the interface 300 may provide a look-up mechanism, whereby an identifier of a particular entity may be found. The transfer action may transfer ownership of the selected currency notes to the specified entity (e.g., ownership of the currency notes 322B and 322E may be transferred to the specified entity).

Alternatively, or in addition, the transfer action 332 may be configured to allow the user of the interface 300 to enter a currency amount to be transferred (e.g., eight (8) U.S. dollars). Responsive to this request, a transaction provider (or other service) may be configured to automatically exchange one or more currency notes for the user to thereby obtain currency in the proper denomination(s) to transfer the requested amount. For example, the transaction provider may automatically exchange a U.S. twenty (20) dollar currency note for a ten (10) dollar currency note, a five (5) dollar currency note, and five (5) one (1) dollar currency notes. From these exchanged notes, the transaction provider may transfer the five (5) dollar currency note and three (3) one (1) dollar currency notes to the specified entity. If a currency note in the desired denomination does not exist (e.g., a transfer or fifty cents ($0.50) is requested), the transaction provider may provide for a transfer of a partial interest in a currency note (e.g., transfer of one-half ownership in a one (1) dollar currency note). Similarly, an automatic exchange to another currency type (e.g., from U.S. dollars to Euros) may be made.

The exchange action 334 may allow the entity to exchange the selected currency notes for one or more other currency notes. As discussed above, the exchange may be made for currency notes of another denomination and/or currency notes of a first type (e.g., United States dollars) may be exchanged for currency notes of another type (e.g., Euros). Selection of the exchange action may allow the user to specify the denomination and/or currency type to exchange.

The view history action 336 may allow the entity to view the ownership history of one or more selected currency notes. The ownership history may provide a listing of the one or more entities that have had ownership of the currency notes (e.g., the currency notes 322B and 322E).

The currency reserve information action 338 may display information regarding the currency reserve that holds the selected currency notes (e.g., currency notes 322B and 322E). As discussed above, the currency reserve information may provide contact information regarding the currency reserve where the physical currency notes are held. In addition, an audit information action 340 may provide information regarding an audit of the selected currency notes. The audit information may include the last date the currency note(s) were verified to be at the currency reserve or the like.

Although not shown in FIG. 3A, the interface 300 could include additional actions, such as reserve transfer action to request a transfer of selected currency notes out of a currency reserve, a fund action, which may be used to add currency notes by transferring funds into a currency reserve, view a transaction history of one or more currency notes (e.g., view a record of the transactions in which ownership the currency note(s) were transferred), and the like.

As discussed above, each currency note may be assigned a UCNID, which, in some embodiments, may comprise a URL or URI. The currency notes listed in the wallet 320 each include respective URL identifiers 322A-322E. The URI/URL identifiers may be referenced on a network (e.g., the Internet). A transaction provider (or other service) may make information about a currency note accessible using the UCNID of the currency note (e.g., the URL or URI of the currency note). For example, submitting the UCNID to the transaction provider (or other service) may cause an interface 301 to be displayed.

Figure 3B:
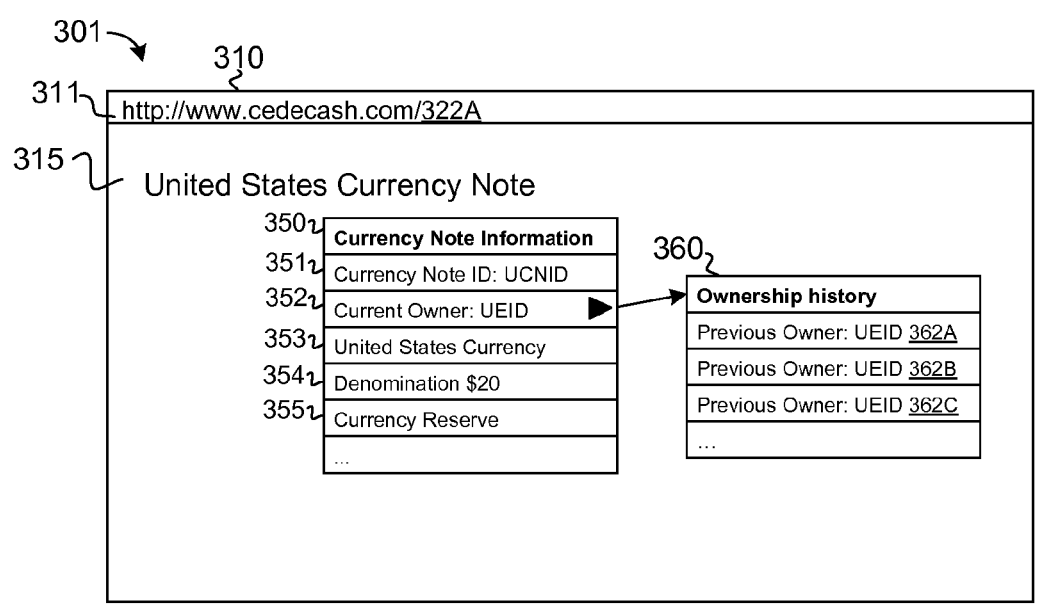
FIG. 3B depicts one embodiment of another transaction provider interface.

FIG. 3B is an example of an interface 301 adapted to display information about an electronically circulated currency note. The interface 301 may be available from a transaction provider (or other service) through the URL or URI of the currency note 311. In the FIG. 3B example, the interface 301 displays information regarding currency note 322A (the UCNID 322A has been entered into the address field of the browser application 310).

The information display 315 provides currency note information 350, which may include, but is not limited to: a display of the currency note identifier 351, a display of the current owner of the currency note 352, a display of the currency type 353 (e.g., United States currency, Euros, etc.), a denomination indicator 354, and/or information regarding the currency reserve 355 that holds the physical currency note.

The ownership information 352 may provide a display of an ownership history of the currency note 360. The ownership history may include a listing of the previous owners 362A-362C of the currency note 322A. Additional information, such as references to transactions in which ownership of the currency note was transferred, may be provided (not shown) on the interface 301.

As discussed above, the currency reserve information 355 may provide a link to additional information relating to the currency reserve holding the currency note. Such information may include, but is not limited to: an address of the currency reserve, contact information for the currency reserve, insurance status of the currency reserve (e.g., indicators as to whether the currency reserve is protected by the FDIC or some other organization), an audit status of the currency reserve (e.g., the date of the last currency audit at the currency reserve), and so on.

Figure 4:
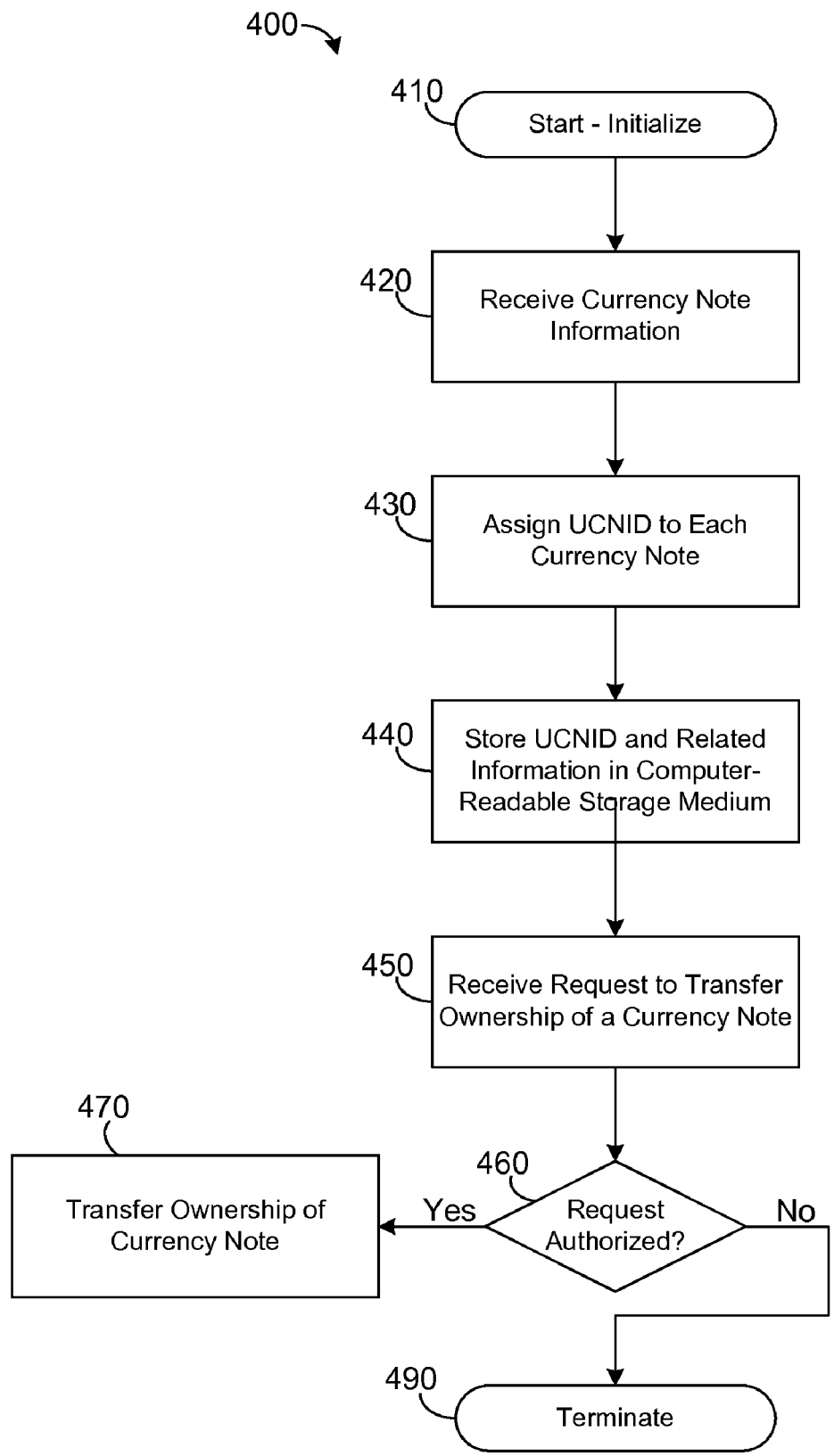
FIG. 4 is a flow diagram of one embodiment of a method for electronically circulating a currency.

FIG. 4 is a flow diagram of one embodiment of a method for electronically circulating a currency. The method 400 may be implemented using one or more computer-readable instructions stored on a computer-readable storage medium. The instructions may be embodied as one or more distinct software modules on the computer-readable storage medium. In addition, one or more of the steps of the method 400 may be implemented using hardware components. Therefore, portions of the method 400 may be tied to particular machine components.

At step 410, the method 400 may be initialized, which may comprise loading computer-readable instructions from a computer-readable storage medium, accessing one or more hardware components (e.g., communications interfaces, computer-readable data storage medium, and the like).

At step 420, the method 400 may receive information regarding a set of currency notes. The currency notes may be disposed in one or more currency repositories and may be dedicated for use in the electronic currency circulation method 400. The information may include, but is not limited to: the currency note type, currency note denomination, currency note serial number, a currency owner of the currency note, information regarding the currency repository of the note, and the like.

At step 430, a UCNID for each of the currency notes may be determined. In the method 400 example, the UCNID may be derived from the serial number of the currency notes and may be embodied as a URI.

At step 440, the method 400 may record the currency note identifiers in a computer-readable storage medium (e.g., in a data structure, such as the data structure 200 described in conjunction with FIG. 2). In addition, at step 440, the currency notes may be associated with respective owners. The owners may be one or more entities, the method 400, the currency reserve, or the like. The association may be made in the computer-readable storage medium.

At step 450, a request to transfer a currency note from a first entity to a second entity may be received. The request may identify the transferor (the first entity) using a UEID of the first entity, may identify the transferee (the second entity) using a UEID and/or alias of the second entity, and may identify the currency note to transfer using the UCNID of the note.

At step 460, the request may be authorized. Authorizing the request may comprise verifying that the request was submitted by the first entity and/or authorized by the first entity, verifying that the request was not tampered with in transit, and/or verifying that the first entity is the owner of the currency note to be transferred. If the request is authorized, the flow may continue to step 470; otherwise, the flow may terminate at step 490.

At step 470, ownership of the currency note may be transferred to the second entity. Transferring ownership may comprise associating the second entity (e.g., a UEID of the second entity) with the currency note in the computer-readable storage medium (e.g., in the data structure 200 of FIG. 2). In addition, a UEID of the first entity may be added to a list of previous owners of the currency note. The transfer may occur while maintaining the physical currency note in the currency reserve.

At step 490, the flow may terminate.

Figure 5:
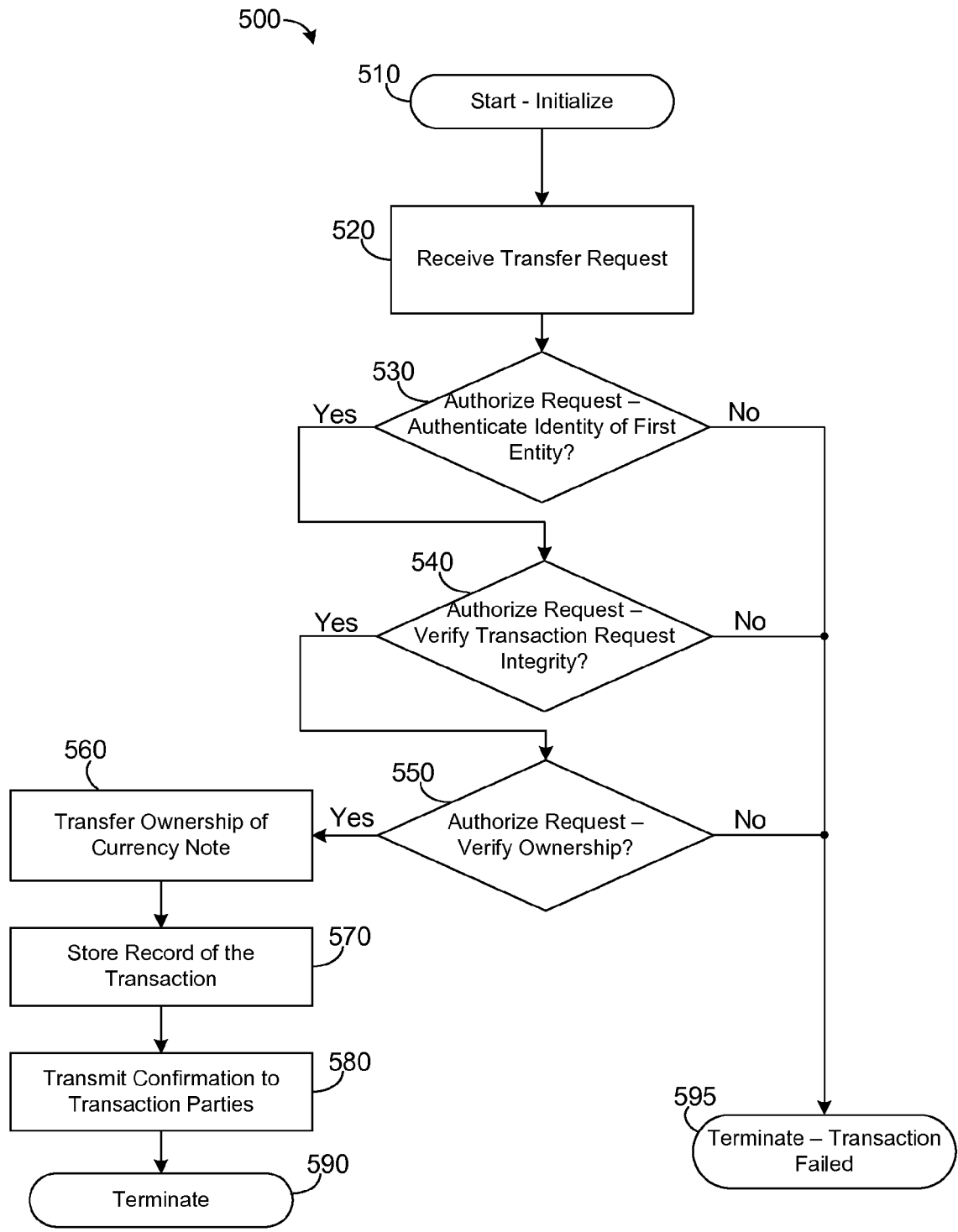
FIG. 5 is a flow diagram of another embodiment of a method for electronically circulating a currency.

FIG. 5 is a flow diagram of another embodiment of a method 500 for electronically circulating a currency. The method 500 may be implemented using one or more computer-readable instructions stored on a computer-readable storage medium. The instructions may be embodied as one or more distinct software modules on the computer-readable storage medium. In addition, one or more of the steps of the method 500 may be implemented using hardware components. Therefore, portions of the method 400 may be tied to particular machine components.

At step 510, the method 500 may be initialized as described above.

At step 520, a request to transfer a currency note from a first entity to a second entity may be received. The request may be transmitted by and/or authorized by a first entity, may identify one or more currency notes to be transferred (e.g., by UCNID of the currency notes), and may identity a transferee (e.g., the second entity) using a UEID of the second entity and/or an alias of the second entity.

At step 530, the method 500 may authorize the request. Authorizing the request at step 530 may comprise determining whether the first entity transmitted the request and/or whether the first entity authorized the request to be transmitted. Step 530 may comprise receiving from the first entity a credential to authenticate the identity of the first entity. Alternatively, or in addition, step 530 may comprise receiving a credential authenticating the first entity from a third-party service (e.g., an authentication provider, such as an OpenID® provider). The credential may authenticate a session of the first entity with the method 500. Alternatively, or in addition, the credential may be attached to the request itself (e.g., as an HTTP AUTH header, a digital signature, or the like). If the method 500 authenticates the identity of the first entity and/or determines that the first entity authorized the request, the flow may continue at step 540; otherwise, the flow may terminate at step 595.

At step 540, the request may be further authorized, which may comprise verifying that the request has not been tampered with in transit. In some embodiments, the verification of step 540 may be performed by the communications channel used to transmit the request. For example, if the request was received over a secure communications protocol (e.g., SSL, or the like), the method 500 may verify that the request was not tampered with and/or modified in transit. Alternatively, or in addition, the request may include a signature or other data that may be used to verify the request. If the request is further authorized (e.g., verified to be free from tampering), the flow may continue at step 550; otherwise, the flow may terminate at step 595.

At step 550, the request may be further authorized, which may comprise verifying that the first entity (the transferor) is the owner of the currency note(s) to be transferred. As discussed above, ownership may be determined by accessing ownership information associated with the currency notes in a data structure (e.g., by comparing an identifier of the first entity to the ownership information of the currency notes). If the first entity is the owner of the identified currency notes, the flow may continue to step 560; otherwise, the flow may terminate at step 595.

At step 560, the method 500 may transfer ownership of the currency note(s) to the second entity. Transferring ownership may comprise associating a UCNID of the currency notes with the UEID of the second entity and/or an alias of the second entity in a data structure stored on a computer-readable storage medium, such as the data structure 200 of FIG. 2. In addition, if the method 500 is configured to maintain a record of the ownership history of currency notes, the first entity may be added to a list of previous owners of the transferred currency note(s).

At step 570, a record of the transaction may be recorded. The record may be made on a computer-readable storage medium and/or on a tangible medium, such as a paper receipt. The record may be maintained by the method 500 and/or may be made available to the first entity and/or the second entity (e.g., via a user interface, by mail, or the like).

At step 580, the method 500 may transmit a confirmation message to the first entity and/or the second entity. The confirmation message may include the details of the transfer, such as the currency notes transferred, the date and/or time of the transfer, and the like. The confirmation message may be authenticated by the method 500 (e.g., using a digital signature or the like) to allow a recipient of the message to verify the authenticity or the message and/or to verify that the message has not been tampered with.

At step 590, the method 500 may terminate.

At step 595, the method may terminate without performing the transfer. In some embodiments, step 595 may include the method 500 recording a record of the failed transaction. The record may specify the reason(s) the transaction was aborted (e.g., failure to authenticate the request, first entity not the owner of the currency, etc.). The record may be recorded on a computer-readable storage medium and/or on a tangible medium (e.g., a paper receipt). Alternatively, or in addition, the record may be transmitted to one or more of the parties to the aborted transaction (e.g., first entity, the second entity, and/or a currency reserve holding the currency note(s)).

Although the flow diagrams of FIGS. 4 and 5 describe a transaction to transfer ownership of electronically circulated currency note(s), the methods 400 and/or 500 could be adapted to perform any other electronic currency circulation task including, but not limited to: exchanging a first set of currency notes for a second set of currency notes (e.g., currency notes of another denomination, issued by another entity or state, and so on), viewing the ownership status of a currency note, viewing the ownership history of a currency note, viewing currency reserve information of a currency note, accessing audit information of a currency note, purchasing currency notes, redeeming currency notes, and so on. Therefore, the flow diagrams of FIGS. 4 and 5 should not be read as limited to any particular set of currency circulation functions.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the invention.

What is claimed is:

1. A system for electronically circulating a currency, comprising:
   a computing device comprising a processor and a computer-readable storage medium; and
   a transaction provider operating on the processor, the transaction provider configured to associate in the computer-readable storage medium, physical currency notes in a physical currency reserve with respective unique currency note identifiers (UCNID), to assign ownership of one of the physical currency notes to a first entity having a unique entity identifier (UEID), and to provide for transferring ownership of the physical currency note from the first entity to a second entity while maintaining the physical currency note in the physical currency reserve.

2. The system of claim 1, wherein the transaction provider is configured to assign ownership of the physical currency note by associating the UCNID of the physical currency note with the UEID of the first entity in the computer-readable storage medium while maintaining the physical currency note in the physical currency reserve.

3. The system of claim 1, wherein transferring ownership of the physical currency note to the second entity comprises associating the UCNID of the physical currency note with a UEID of the second entity in the computer-readable storage medium while maintaining the physical currency note in the physical currency reserve.

4. The system of claim 1, wherein ownership of the physical currency note is transferred from the first entity to the second entity responsive to the transaction provider receiving a transfer request, and wherein the transaction provider is configured to authorize the transfer request and to transfer ownership of the physical currency note from the first entity to the second entity if the transaction request is authorized.

5. The system of claim 4, wherein the transfer request comprises a digital signature, and wherein the transaction provider is configured to authorize the transaction request using the digital signature.

6. The system of claim 4, wherein authorizing the transaction request comprises receiving a credential from a third-party, wherein the credential authenticates the transfer request and/or verifies that the transfer request is authorized by the first entity.

7. The system of claim 6, wherein the third-party is one selected from an OpenID provider, a SAML authentication authority, a Liberty Alliance authentication authority, and a certificate authority.

8. The system of claim 4, wherein authorizing the transaction request comprises the transaction provider verifying that the first entity is the owner of the physical currency note by comparing UEID associated with the UCNID of the physical currency note in the computer-readable storage medium to the UEID of the first entity.

9. The system of claim 1, wherein a UEID comprises one of an email address, a uniform resource identifier (URI), a uniform resource located (URL), a uniform resource name (URN), and a distinguished name (DN), and wherein a UCNID comprises one of a URI, a URL, a URN, and a DN.

10. The system of claim 1, wherein the transaction provider is configured to provide a listing of physical currency notes owned by a particular entity responsive to a request comprising the UEID of the particular entity.

11. The system of claim 1, wherein the transaction provider is configured to provide an indication of the owner of the physical currency note responsible to a query comprising the UCNID of the physical currency note.

12. The system of claim 1, wherein the transaction provider is configured to maintain on the computer-readable storage medium, an ownership history of the physical currency note, wherein the ownership history comprises UEIDs of entities who have had ownership of the physical currency note, and wherein the transaction provider is configured to provide the ownership history of the physical currency note responsive to a query comprising the UCNID of the physical currency note.

13. The system of claim 1, wherein the transaction provider is configured to exchange ownership of a first physical currency note of a first denomination for ownership of one or more physical currency notes of different denominations responsive to a request by the owner of the first physical currency note.

14. A non-transitory computer-readable storage medium comprising instructions to cause a computing device comprising a processor and memory to perform a method for electronically circulating a currency, the method comprising:
assigning respective unique currency note identifiers (UCNIDs) to each of a plurality of physical currency notes deposited in a physical currency reserve;
assigning ownership of one of the plurality of physical currency notes to a first one of a plurality of entities, wherein each of the entities has a respective unique entity identifier (UEID), and wherein assigning ownership of the physical currency note to the first entity comprises associating the UCNID of the physical currency note with the UEID of the first entity in a computer-readable storage medium;
receiving a request to transfer the physical currency note from the first entity to a second one of the plurality of entities;
authorizing the request; and
transferring ownership of the physical currency note from the first entity to the second entity if the request is authorized, wherein the ownership of the physical currency note is transferred to the second entity while maintaining the physical currency note in the physical currency reserve.

15. The non-transitory computer-readable storage medium of claim 14, wherein transferring ownership of the physical currency note from the first entity to the second entity comprises associating the UCNID of the physical currency note with the UEID of the second entity in the computer-readable storage medium.

16. The non-transitory computer-readable storage medium of claim 14, wherein authorizing the request comprises one of validating a digital signature associated with the request, validating a credential provided by the first entity, and receiving a credential authenticating the first entity and/or authenticating the request from a third-party.

17. The non-transitory computer-readable storage medium of claim 14, wherein authorizing the request comprises verifying that the first entity is the current owner of the physical currency note, wherein verifying that the first entity is the owner of the physical currency note comprises comparing the UEID of the first entity to the UEID associated with the physical currency note.

18. The non-transitory computer-readable storage medium of claim 14, wherein the method further comprises transmitting a record of the ownership transfer to one of the first entity, the second entity, and the physical currency reserve.

19. The non-transitory computer-readable storage medium of claim 14, wherein the method further comprises storing a record of the ownership transfer on one of the computer-readable storage medium and a tangible medium.

20. A method for electronically circulating a currency performed by a computing device, having a processor and computer-readable storage medium, the method comprising:
using a processor of a computing device to perform the steps of,
assigning a unique identifier to each of a plurality of physical currency notes deposited in a physical currency reserve, wherein the unique identifier of a physical currency note is derived from an attribute of the physical currency note using the processor of the computing device;
assigning ownership of a first one of the plurality of physical currency notes to a first entity, the first entity having a unique entity identifier using the processor of the computing device;
receiving a request to transfer ownership of the physical currency note from the first entity to a second entity, the second entity having a unique entity identifier;
authorizing the request, wherein authorizing the request comprises verifying that the request was authorized by the first entity, and verifying that the first entity is the owner of the physical currency note; and
if the request is authorized, assigning ownership of the physical currency note to the second entity by associating the unique identifier of the physical currency note with the unique identifier of the second entity using the processor of the computing device.

21. The method of claim 20, wherein the physical currency notes are United States dollar currency notes, and wherein the first entity is the owner of a physical currency note of a first denomination, the method further comprising:
providing for the first entity exchanging ownership of the first physical currency note for ownership of a set of different physical currency notes, wherein the set of different physical currency notes comprises physical currency notes of a different denomination than the first physical currency note, and wherein exchanging ownership comprises, in the computer-readable storage medium, associating the unique identifier of the first entity with each of the unique identifiers of the physical currency notes in the set of different currency notes.

* * * * *